US010064482B2

(12) United States Patent
Leafgren

(10) Patent No.: US 10,064,482 B2
(45) Date of Patent: Sep. 4, 2018

(54) COLLAPSIBLE STAND

(71) Applicant: StandStand, Inc., Cambridge, MA (US)

(72) Inventor: Luke Leafgren, Cambridge, MA (US)

(73) Assignee: StandStand Inc., Cambridge, MA (US)

( * ) Notice: Subject to any disclaimer, the term of this patent is extended or adjusted under 35 U.S.C. 154(b) by 0 days.

(21) Appl. No.: 14/831,841

(22) Filed: Aug. 20, 2015

(65) Prior Publication Data
US 2018/0035799 A1 Feb. 8, 2018

Related U.S. Application Data

(60) Provisional application No. 62/039,898, filed on Aug. 20, 2014.

(51) Int. Cl.
| A47B 3/06 | (2006.01) |
| A47B 13/04 | (2006.01) |
| A47B 21/00 | (2006.01) |
| A47B 13/00 | (2006.01) |
| A47B 23/00 | (2006.01) |
| A47F 5/16 | (2006.01) |
| A47B 87/02 | (2006.01) |
| F16M 11/00 | (2006.01) |

(52) U.S. Cl.
CPC .............. *A47B 3/06* (2013.01); *A47B 13/003* (2013.01); *A47B 13/04* (2013.01); *A47B 21/00* (2013.01); *A47B 23/00* (2013.01); *A47B 87/0246* (2013.01); *A47F 5/16* (2013.01); *F16M 11/00* (2013.01); *A47B 2230/0029* (2013.01); *A47B 2230/0088* (2013.01); *A47B 2230/0092* (2013.01)

(58) Field of Classification Search
CPC .......... A47B 2220/0086; A47B 13/003; A47B 27/32; A47B 3/12; A47B 27/00
USPC .............. 108/157.14, 157.1, 157.15, 157.16, 108/157.17, 157.18, 159
See application file for complete search history.

(56) References Cited

U.S. PATENT DOCUMENTS

| 565,435 | A | * | 8/1896 | Crater | A47B 13/021 |
| | | | | | 108/157.1 |
| 919,257 | A | * | 4/1909 | Seydewitz | A47B 3/12 |
| | | | | | 108/101 |
| 1,940,117 | A | * | 12/1933 | Carpos | A47B 3/06 |
| | | | | | 108/157.18 |
| 3,620,175 | A | * | 11/1971 | Crane et al. | A47B 3/12 |
| | | | | | 108/157.14 |
| 4,436,354 | A | * | 3/1984 | Thorud | A47B 43/02 |
| | | | | | 220/532 |
| 5,911,177 | A | * | 6/1999 | Fox | A47B 3/002 |
| | | | | | 108/12 |
| 6,267,065 | B1 | * | 7/2001 | Lin | A47B 13/003 |
| | | | | | 108/157.14 |
| 6,676,231 | B1 | * | 1/2004 | Kelley | A47B 83/001 |
| | | | | | 108/50.01 |
| 6,827,028 | B1 | * | 12/2004 | Callaway | A47B 3/06 |
| | | | | | 108/157.1 |

(Continued)

Primary Examiner — Jose V Chen
(74) Attorney, Agent, or Firm — Fish & Richardson P.C.

(57) ABSTRACT

A collapsible stand for includes a base unit and top surface for supporting and elevating various articles to be accessible from a standing position. The base unit and top surface are assembled in an interlocking fashion that can be easily convertible from a storage configuration to a use configuration.

10 Claims, 15 Drawing Sheets

(56) References Cited

U.S. PATENT DOCUMENTS

| | | | |
|---|---|---|---|
| 7,415,933 B2 * | 8/2008 | Sagol | A47B 3/02 108/115 |
| 7,516,708 B2 * | 4/2009 | Willy | A47B 3/06 108/153.1 |
| 8,020,497 B2 * | 9/2011 | Ossorguine | A47B 87/02 108/157.14 |
| 8,074,584 B2 * | 12/2011 | Collins | F16B 12/52 108/156 |
| 9,364,077 B2 * | 6/2016 | Werner | A47C 9/10 |
| 9,474,363 B1 * | 10/2016 | Orsini | A47B 3/06 |
| 2002/0100398 A1 * | 8/2002 | Santini | A47B 23/042 108/157.1 |
| 2004/0055515 A1 * | 3/2004 | Chen | A47B 13/00 108/157.14 |
| 2008/0245281 A1 * | 10/2008 | Willy | A47B 13/003 108/157.16 |
| 2010/0096964 A1 * | 4/2010 | Bertele | A47B 43/02 312/259 |

* cited by examiner

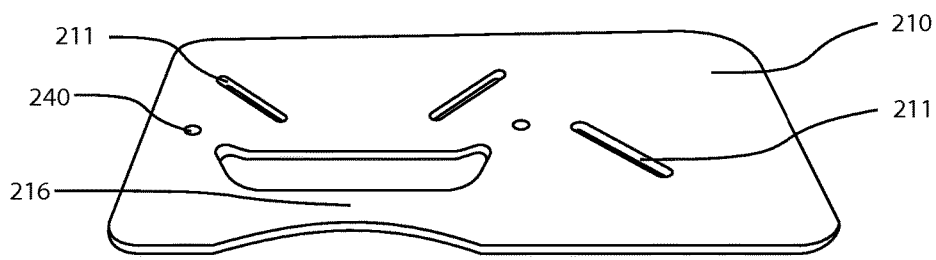
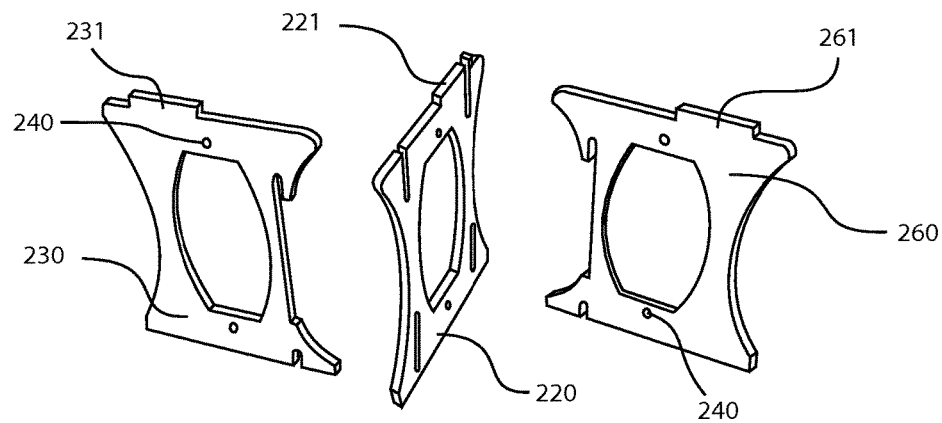
FIG. 11
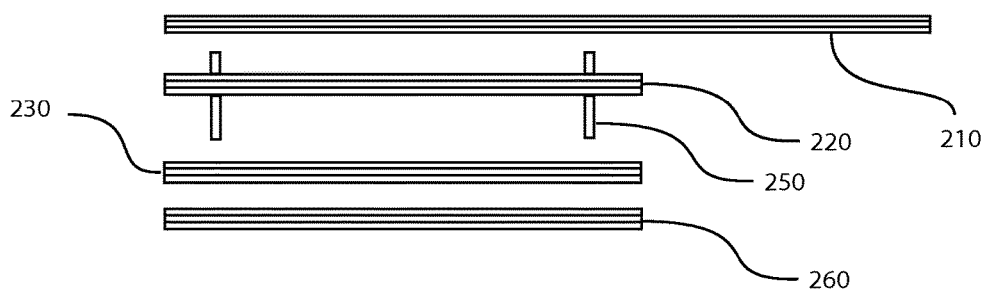
FIG. 12

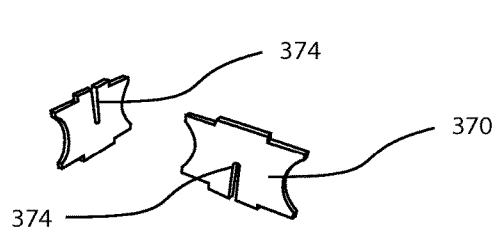 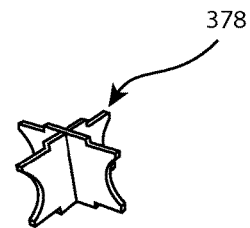
FIG. 17A    FIG. 17B
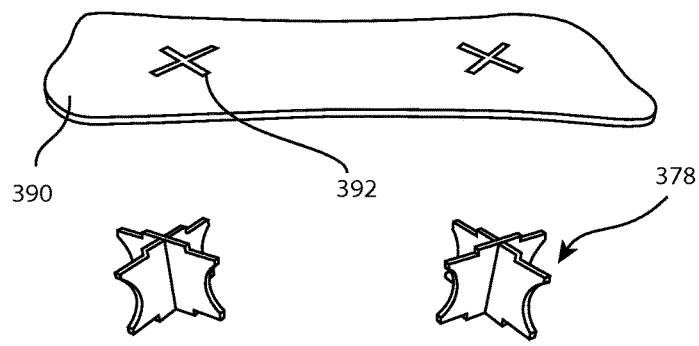
FIG. 18
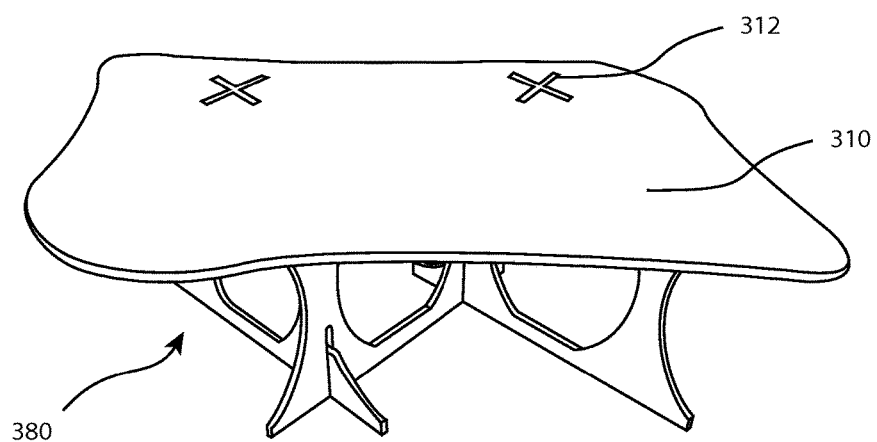

COLLAPSIBLE STAND

RELATED APPLICATIONS

The present U.S. Utility Patent Application claims priority pursuant to 35 U.S.C. § 119(e) to U.S. Provisional Application No. 62/039,898, filed on Aug. 20, 2014, hereby incorporated by reference in its entirety and made part of the present U.S. Utility Application for all purposes.

BACKGROUND OF THE INVENTION

This application relates to collapsible furniture, and more specifically to a quickly assembled load supporting and elevating stand for laptops, monitors, keyboards, mice, or other articles.

Many people use computers for hours a day, generally in a seated position. Prolonged sitting and poor ergonomics have been shown to be detrimental to one's health and well-being, as well as reducing mental clarity, alertness, and productivity. Research has shown that the cumulative impact of sitting for hours a day for years is associated with a range of health problems, including obesity, heart disease, and cancer. The benefits of standing for periods of time throughout the workday have been widely accepted to combat long-term effects of sedentary seated work practices. However, the high cost of standing desks, especially adjustable standing desks that allow transition from seated working to standing working, has slowed the widespread adoption of interspersed standing while working. For those workers who may have standing desks at home or work, it is often desirable to be able to continue healthful work practices while traveling or otherwise working remotely. There is therefore a need for a convenient, low-cost, portable, effective solution for providing a workspace that allows for both seated and standing working.

BRIEF SUMMARY OF THE INVENTION

The invention relates to a collapsible stand that can be used to raise a worker's keyboard, monitor, laptop, mouse, books, papers, or other desired article to be easily accessible from a standing position. In some embodiments of the present invention, the stand is easily collapsible for transportation, and can conveniently fit in a briefcase, computer bag, or otherwise easily carried. In some embodiments, a collapsible stand is disclosed comprising a plurality of interlocking base members, and a top member secured to the base members to provide a stable, elevated platform.

In other embodiments, a shelf member is provided on a top surface of the top member to provide a further elevated surface. In still other embodiments, the base members, top member or shelf can include a series of bores defined therein, with one or more of the base members, top member or shelf including a dowel that extends through the bores when the stand is in a storage configuration in order to securely transport the stand.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

FIG. 11 shows an exploded view of base members of the collapsible stand of FIG. 9 in an orientation for assembly into a use configuration;

FIG. 12 shows a side view of the collapsible stand of FIG. 9 in an orientation for assembly into a storage configuration;

FIGS. 17A & 17B show perspective views of unassembled and assembled, respectively, risers of the collapsible stand of FIG. 13; and FIG. 18 shows an exploded view of the collapsible stand of FIG. 13 in an orientation for assembly into a use configuration.

DETAILED DESCRIPTION

Preferred embodiments of a collapsible stand in accordance with the present invention are disclosed herein.

Figure 1:
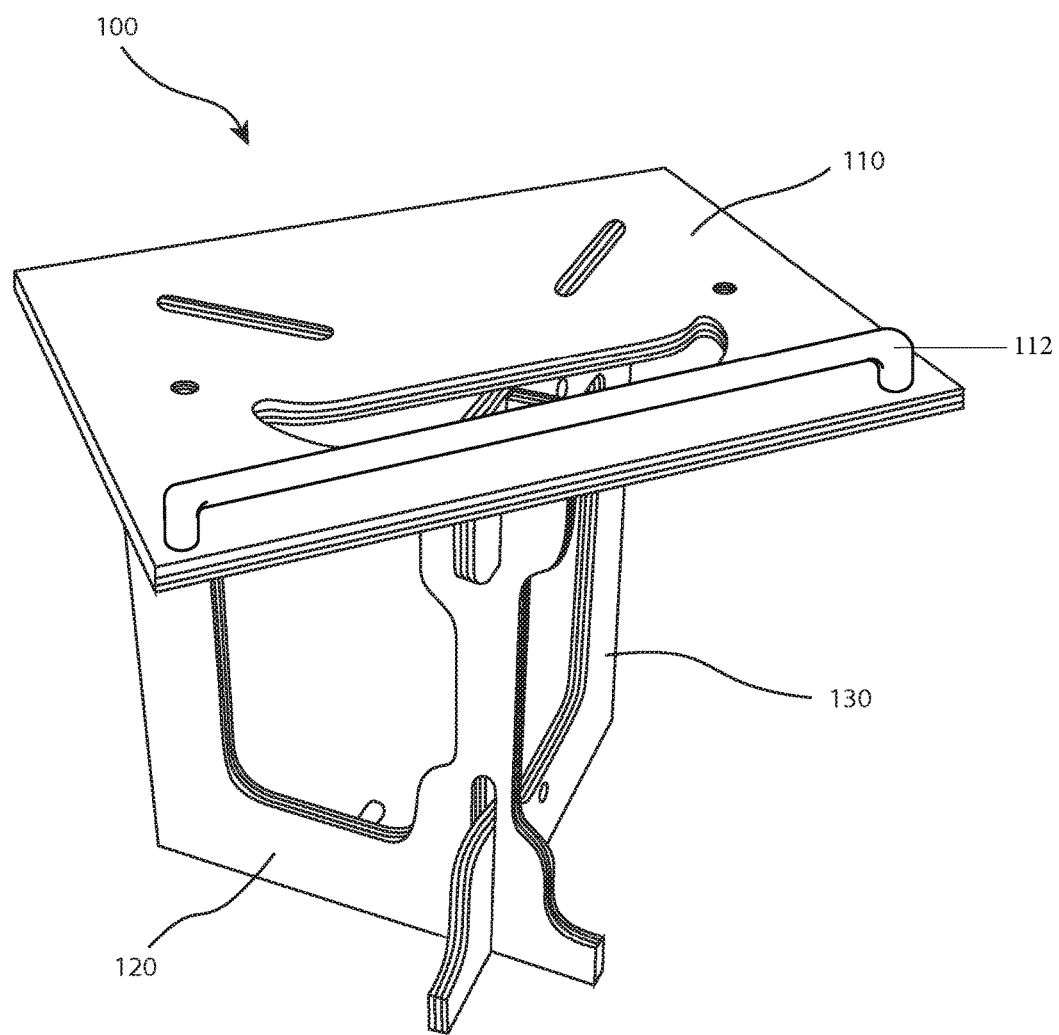
FIG. 1 shows a front perspective view of a first embodiment of a collapsible stand in accordance with the present disclosure in a use configuration.
Figure 2:
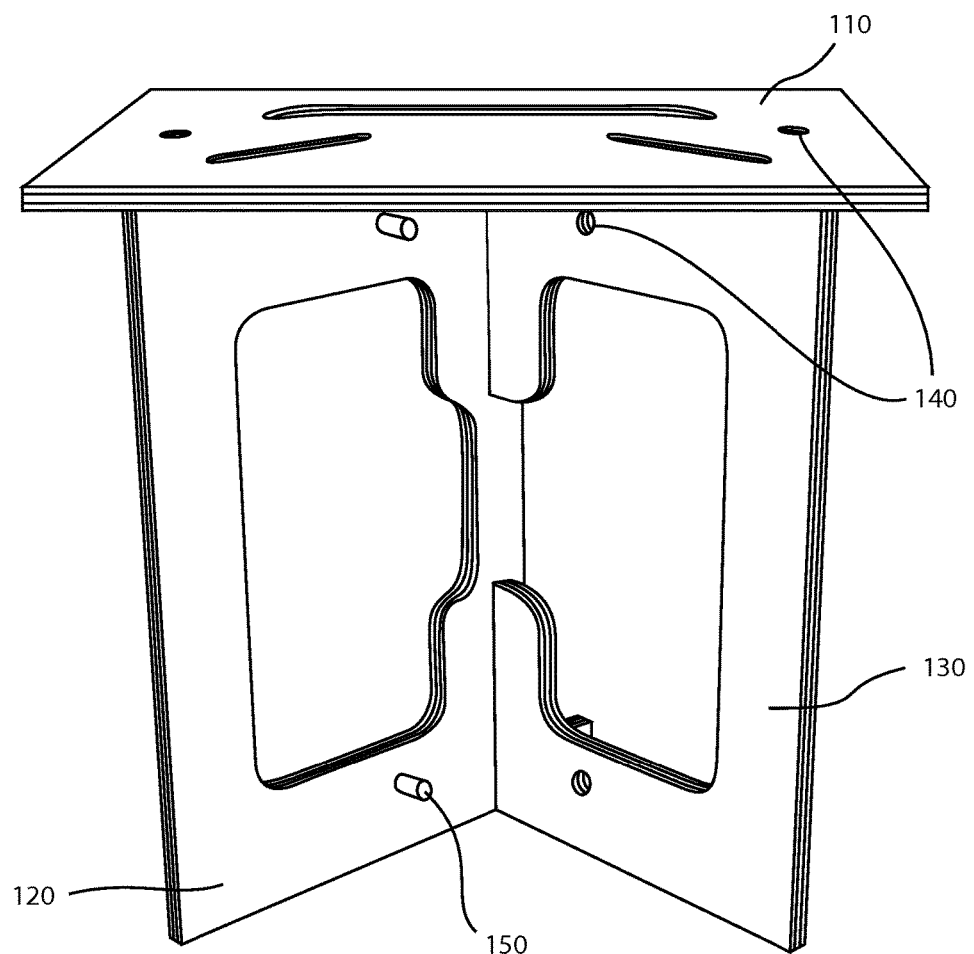
FIG. 2 shows a rear perspective view of the waste collection device of FIG. 1.

FIG. 1 shows a preferred embodiment of a collapsible stand 100 that comprises a top member 110, first base member 120 and second base member 130. As seen in FIG. 2, top member 110 and base members 120/130 have defined therein bores 140 for securing the stand in a storage configuration as in FIG. 8.

Figure 3:
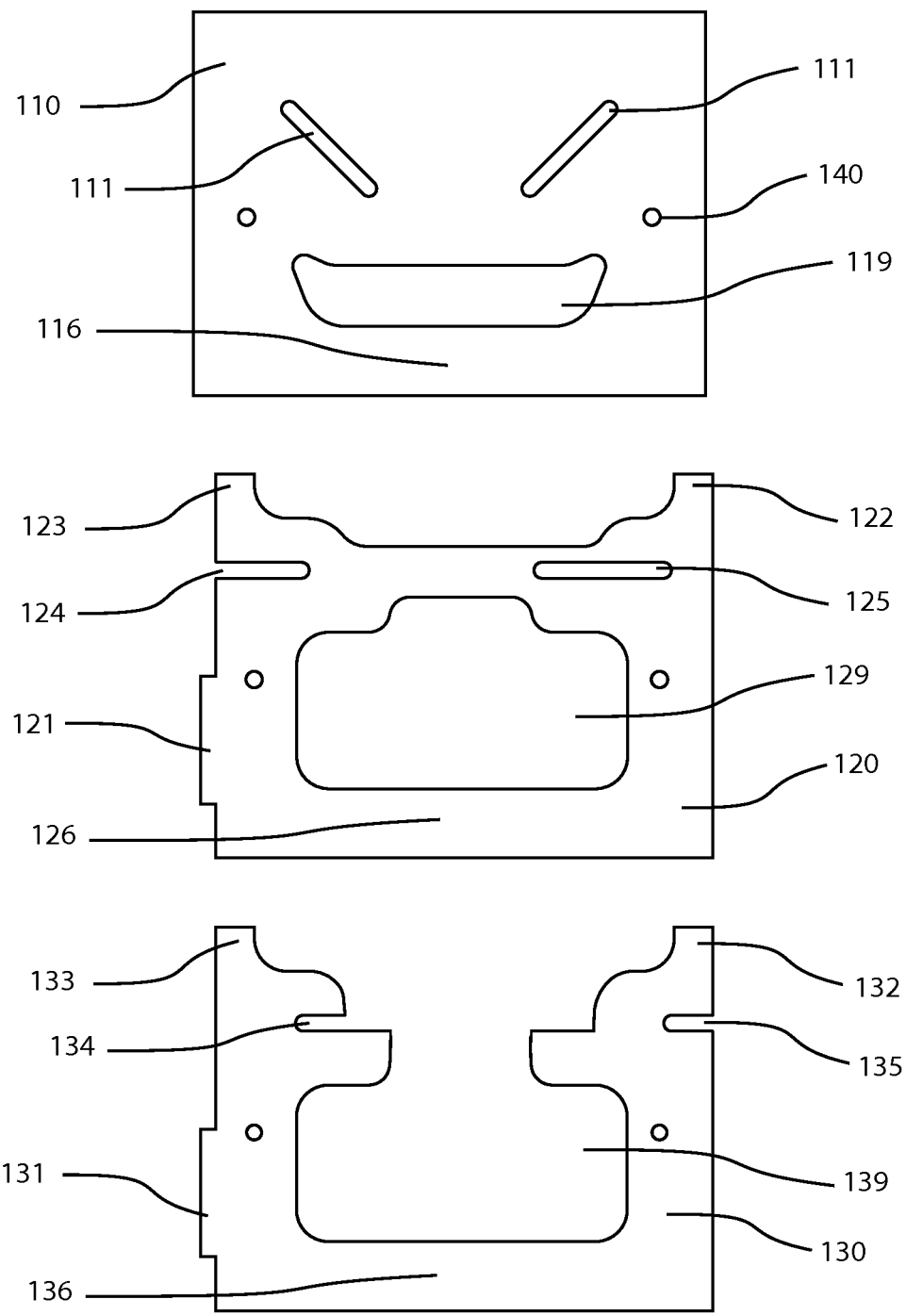
FIG. 3 shows a top view of the components of the collapsible stand of FIG. 1.

The various components of the stand of FIG. 1 are shown in FIG. 3. Top member 110 and base members 120/130 are shown to be substantially rectangular in shape, and occupy the same general circumferential boundary defined by the top member 110. Each of the top member 110 and base members 120/130 also include a pair of bores 140 defined therein. Top member 110 defines two angled slots 111 and a top opening 119. The area between opening 119 and a bottom edge of the top member defines a handle area 116. In addition to providing for a handle, top opening 119 further reduced the weight of the top member 110 as well as providing for ventilation of a laptop of or other device disposed on the surface of top member 110 when in the use configuration of FIG. 1.

First and second base members 120/130 each include tabs 121/131, stabilizer feet 122/132, support arms 123/133, base openings 129/139, and base handle areas 126/136. First base member 120 further defines a first base slot 125 and a first base top notch 124. Second base member 130 further defines a second base bottom notch 135 and second base top notch 134. The angled slots 111, first base slot 125, first base top notch 124, second base bottom notch 135, second base top notch 134 and tabs 121/131 are all sized to be the width of the top and base members so that when the pieces are interconnected the stand is stable. Alternatively, interconnected parts can be machined down or made larger to accommodate different slot and notch thicknesses.

Figure 4:
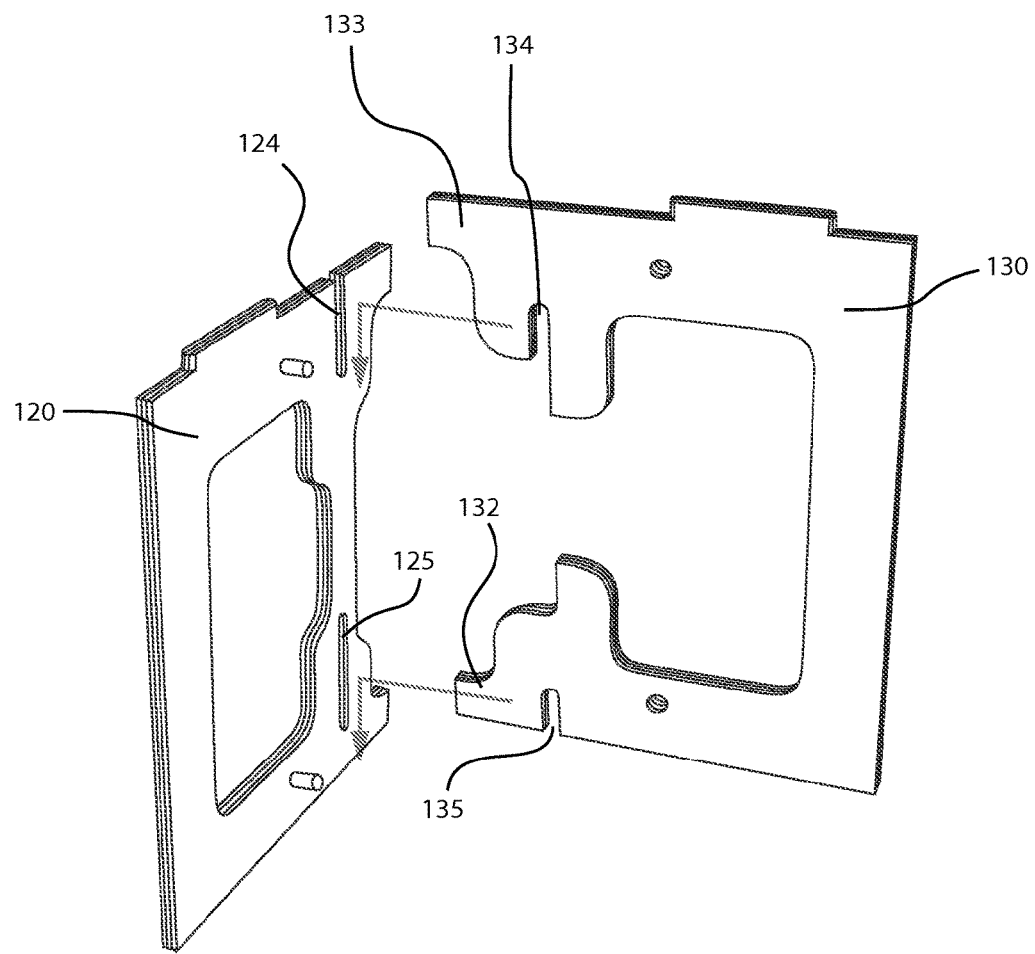
FIG. 4 shows an exploded view of base members of the collapsible stand of FIG. 1 in an orientation for assembly into a use configuration.
Figure 5:
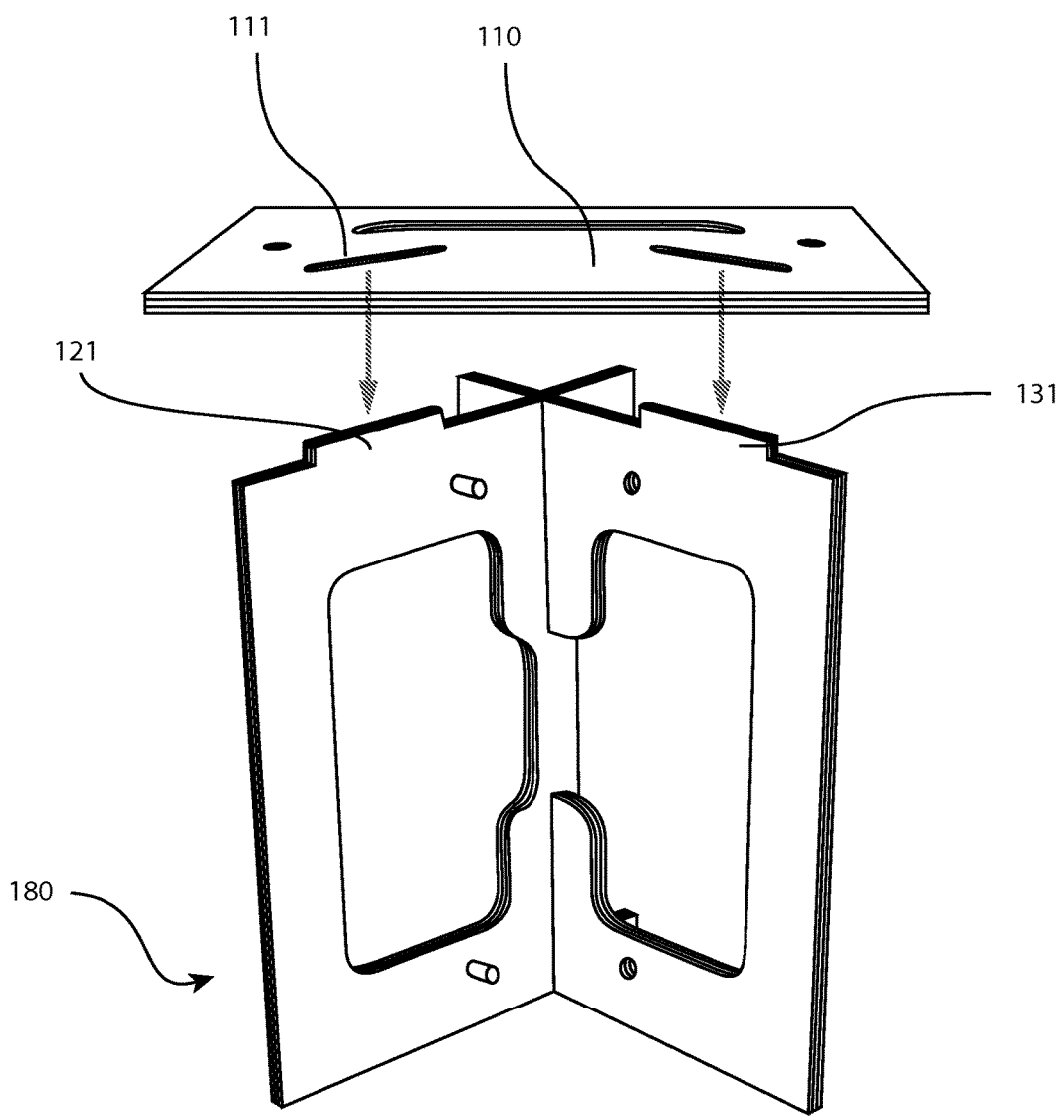
FIG. 5 shows an exploded view of assembled base members and top member of the collapsible stand of FIG. 1 in an orientation for assembly into a use configuration.

FIGS. 4 and 5 show how the base members 120/130 and top member 110 are assembled into a use configuration. The arrows in the figure help illustrate the positioning and movement of each of the components to produces an assembled base unit 180 shown in FIG. 5. In a first step of the assembly process, second base stabilizer foot 132 is slid into first base slot 125 while second base member support arm 133 is slid through first base top notch 124. When second base bottom notch 135 and second base top notch 134 reach first base slot 125 and first base top notch 124, second base member is slid downward such that second base bottom notch 135 and second base top notch 134 engage first base member 120 in an interlocking fashion as seen in FIG. 5. Once base unit 180 is assembled, top member 110 is positioned over the base unit 180 such that angled slots 111 line up with tabs 121/131 when it is then lowered to secure the tabs 121/131 within angled slots 111 as seen in FIG. 2.

Figure 6:
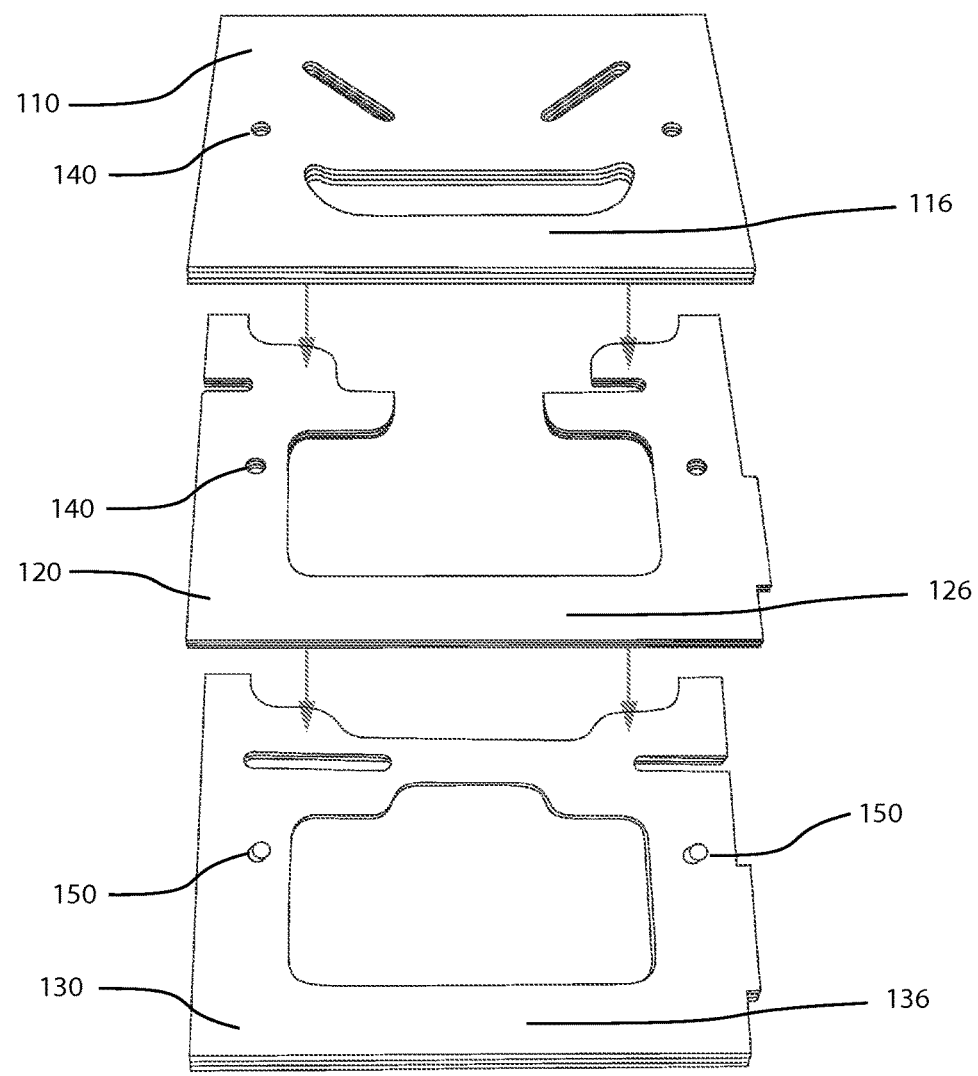
FIG. 6 shows a front perspective view of the collapsible stand of FIG. 1 in an orientation for assembly into a storage configuration.
Figure 7A:
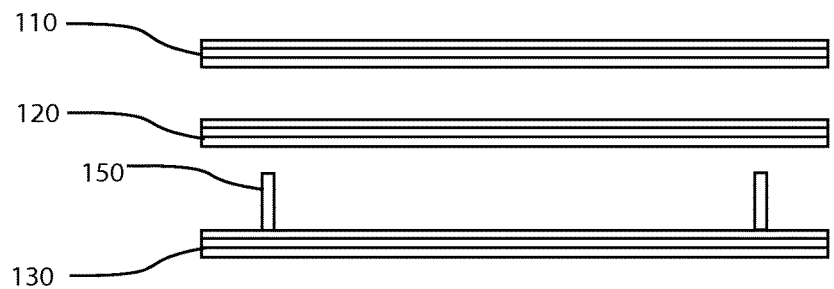
FIGS. 7A & 7B show side views of various embodiments for dowel placement for securing the collapsible stand of FIG. 1 in a storage configuration.
Figure 7B:
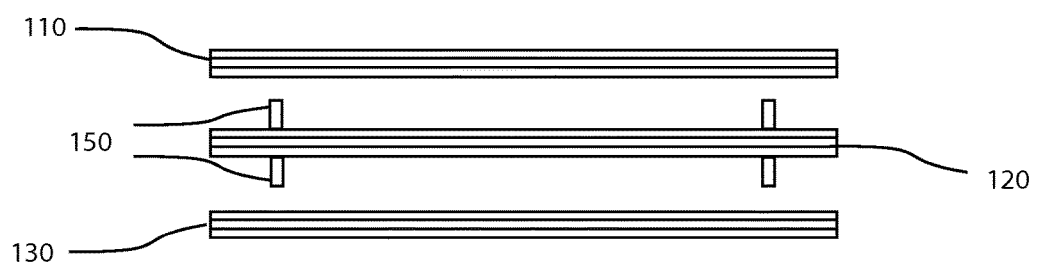

FIG. 6 shows how the base members 120/130 and top member 110 are assembled into a storage configuration. The arrows in the figure help illustrate the positioning and movement of each of the components to produces an assembled unit shown in FIG. 8 relative to Cartesian coordinates 802. First the top member 110 and base members 120/130 are aligned so that handle areas 116/126/136 are aligned along the same edge, and bores 140 are positioned collinearly. One of the base members, shown as the second base member 130 in FIG. 6, has disposed in line with the bores 140 dowels 150 that extends through the bores 140 in the other members. As seen in FIGS. 7A and 7B, dowels 150 can extend upward from the second base member 130 through both the first base member 120 and top member 110 as in FIG. 7A, or can extend upward and downward from first base member 120 to engage bores 140 in the top member 11 and second base member 130. Dowels 150 can be secured to a member from which it extends either by friction fitting, adhesives, fasteners, or any other known connection means. Alternatively, the dowels 150 can be formed as a unitary structure with a member if the member is manufactured by a molding or shaping process.

Figure 8:
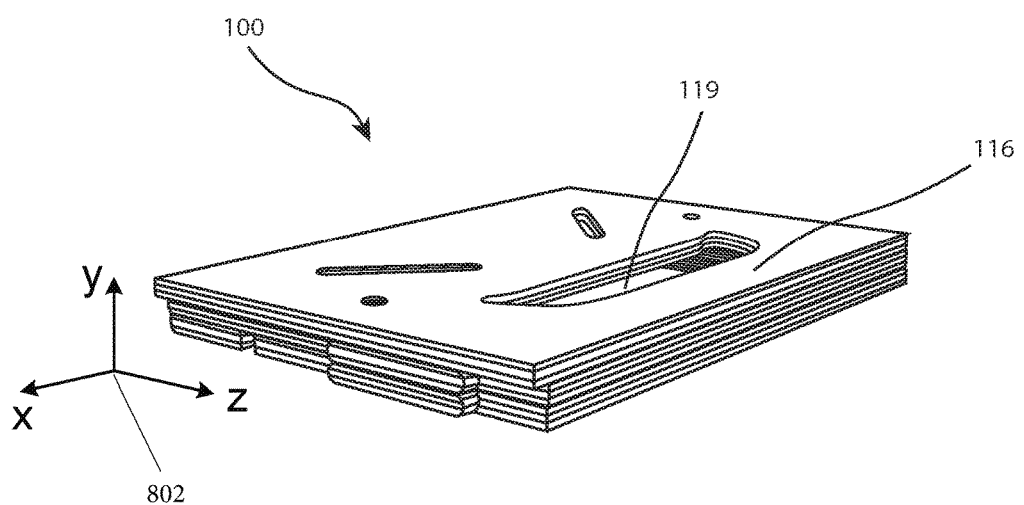
FIG. 8 shows a top isometric view of the collapsible stand of FIG. 1 in a storage configuration.

Once the stand 100 is in a storage configuration as in FIG. 8, the dowels inhibit relative sliding motion between the members 110/120/130. Furthermore, because the handle areas 116/126/136 are aligned, the stand 100 can be grasped through opening 119 for easy transport.

Figure 9:
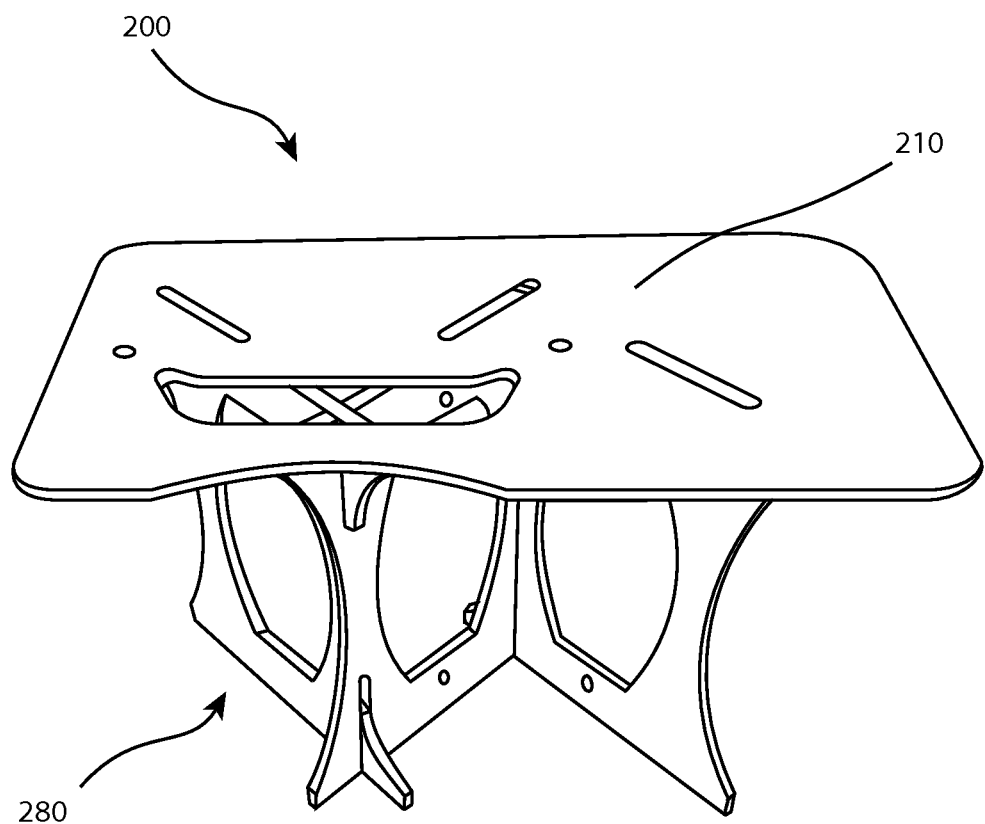
FIG. 9 shows a front perspective view of a second embodiment of a collapsible stand in accordance with the present disclosure.

FIG. 9 shows a second preferred embodiment of a collapsible stand 200 having top member 210 secured to base unit 280. This stand 200 is wider than stand 100 in order to accommodate more or larger items. Because of this, base unit 280 comprises three base members in order to provide a more stable base. The basic assembly and functionality of the stand 200 are similar to those of stand 100 as described above, with the addition of similar structures to support and interlock the third base member to the other base members and top member 210.

Figure 10:
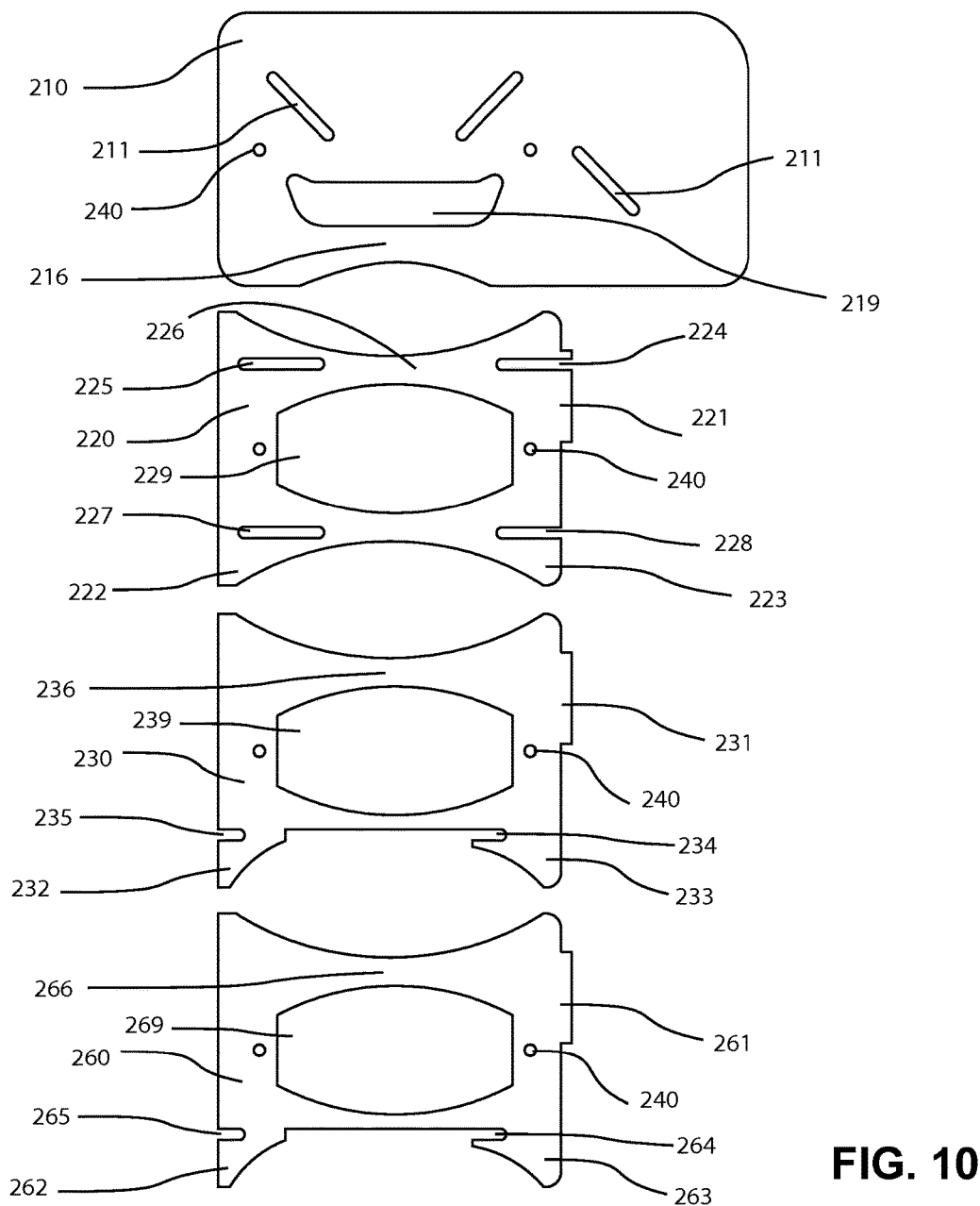
FIG. 10 shows a top view of the components of the collapsible stand of FIG. 9.

The various components of the stand of FIG. 9 are shown in FIG. 10. As with the components of stand 100, each of the top member 210 and base members 220/230/260 also include a pair of bores 240 defined therein. Top member 210 defines three angled slots 211 and a top opening 219. The area between opening 219 and a bottom edge of the top member 210 defines a handle area 216. In addition to providing for a handle, top opening 219 further reduced the weight of the top member 210 as well as providing for ventilation of a laptop of or other device disposed on the surface of top member 210 when in the use configuration.

First, second, and third base members 220/230/260 each include tabs 221/231/261, stabilizer feet 222/232/262, support arms 223/233/263, base openings 229/239/269, and base handle areas 226/236/266. First base member 220 further defines a first base slots 225/227 and a first base top notches 224/228. Second base member 230 further defines a second base bottom notch 235 and second base top notch 234. Third base member 260 further defines a second base bottom notch 265 and second base top notch 264.

FIG. 11 shows how the base members 220/230/260 and top member 210 are set up to be assembled into a use configuration. The positioning and movement of each of the components to produces an assembled base unit 280 shown in FIG. 9 are interconnect in a similar manner to the way stand 100 is assembled in FIGS. 4 and 5, with stabilizer feet 232/262 sliding into first base slots 225/227 while support arms 233/263 are slid through first base top notches 224/228. When base bottom notches 235/265 and base top notches 234/264 reach first base slots 225/227 and first base top notches 224/228, the second and third base members are slid downward such that base bottom notches 235/265 and base top notches 234/264 engage first base member 220 in an interlocking fashion as seen in FIG. 9. Once base unit 280 is assembled, top member 210 is positioned over the base unit 280 such that angled slots 211 line up with tabs 221/231/261 when it is then lowered to secure the tabs 221/231/261 within angled slots 211 as seen in FIG. 9.

FIG. 12 shows a side view how the base members 220/230/260 and top member 210 are assembled into a storage configuration. First the top member 210 and base members 220/230/260 are aligned so that handle areas 216/226/236/266 are aligned along the same edge, and bores 240 are positioned collinearly. One of the base members, shown as the second base member 220 in FIG. 12, has disposed in line with the bores 240 dowels 250 that extends through the bores 240 in the other members. In FIG. 12, dowels 250 extend upward and downward from first base member 220 to engage bores 240 in the top member 211 and second and third base members 230/260. As before with stand 100, the dowel 250 can extend from any of the members.

Once the stand 200 is in a storage configuration similar to the stand 100 in FIG. 8, the dowels 250 inhibit relative sliding motion between the members 210/220/230/260. Furthermore, because the handle areas 216/226/236/266 are aligned, the stand 200 can be grasped through opening 219 for easy transport.

Figure 13:
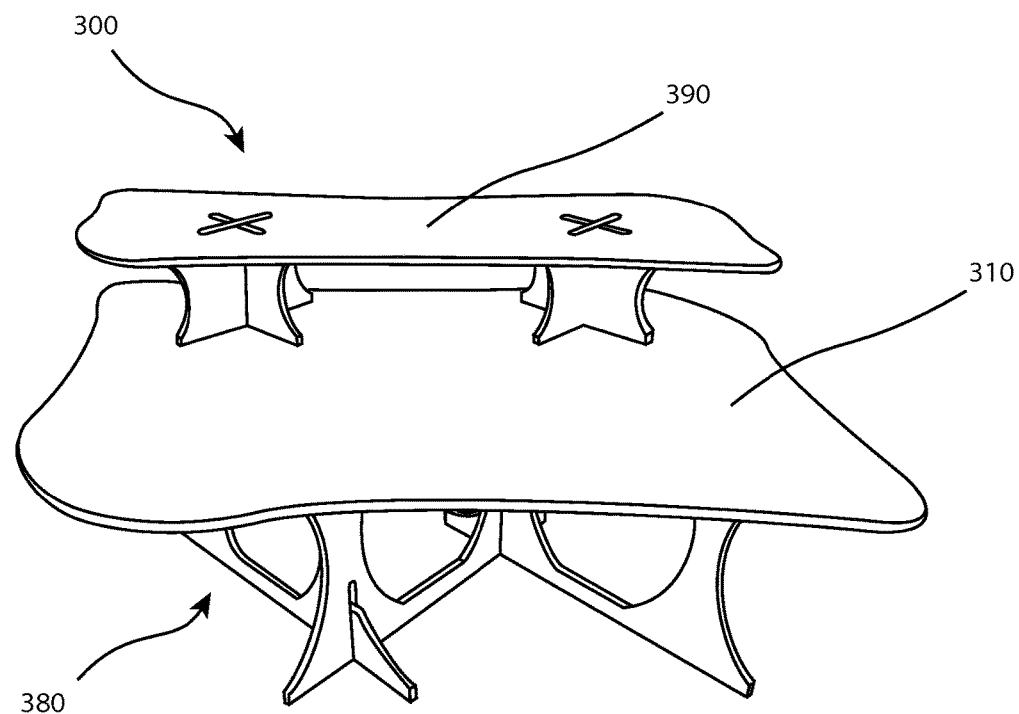
FIG. 13 shows a front perspective view of a third embodiment of a collapsible stand in accordance with the present disclosure in a use configuration.
Figure 15:
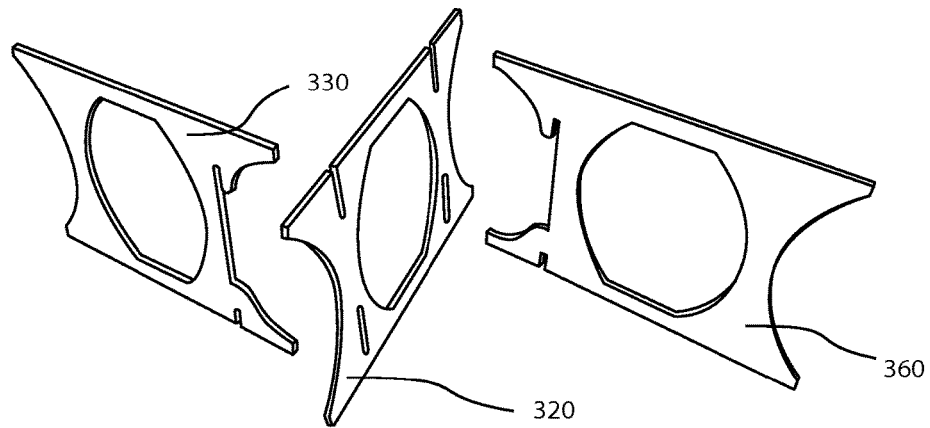
FIG. 15 shows an exploded view of base members of the collapsible stand of FIG. 13 in an orientation for assembly into a use configuration.
Figure 16:
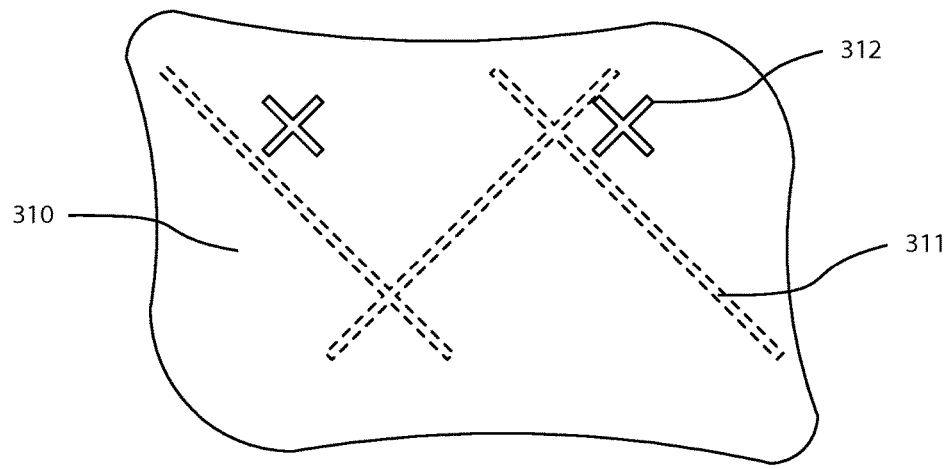
FIG. 16 shows a top view of the top member of the collapsible stand of FIG. 13.

FIG. 13 shows a third preferred embodiment of a collapsible stand 300 having top member 310 secured to base unit 380. This stand 300 is wide, similar to stand 200, and further includes a shelf 390 to elevate additional items such as monitors, papers, books, etc., from the top surface of top member 310. Base 380 is similarly constructed to that of stand 280, and is made up of first second and third base members 320/330/360, assembled in the same manner as seen in FIG. 15.

Figure 14:
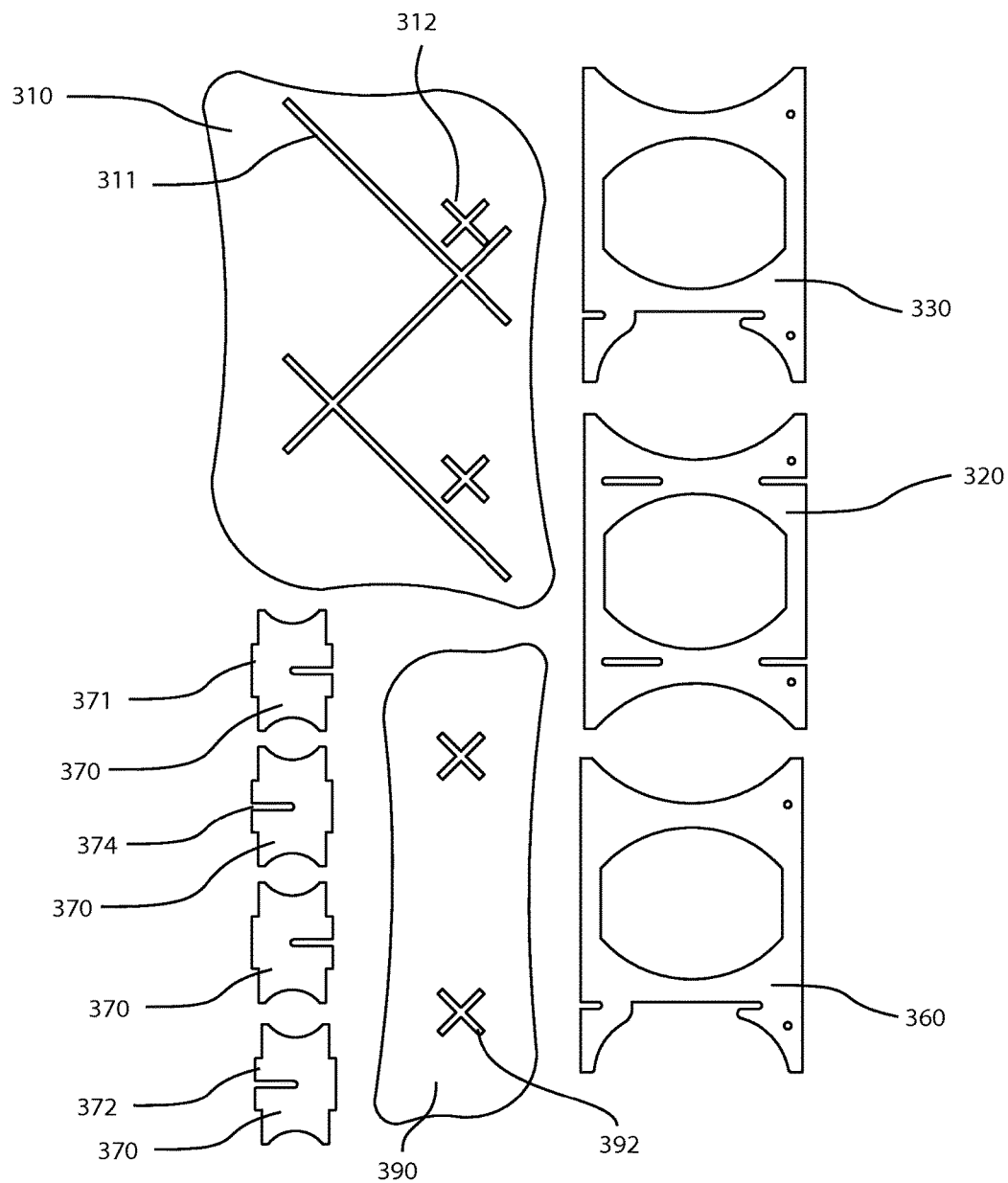
FIG. 14 shows a top view of the components of the collapsible stand of FIG. 13.

The various components of the stand of FIG. 13 are shown in FIG. 14. Top member 310 defines three angled grooves 311 that do not penetrate all the way through the thickness of the top member 310, and the top edges of base members 320/330/360 fit into the grooves to prevent the top member 310 from sliding off base unit 380. Alternatively, tabs and slots can be used in a manner similar to stands 100 and 200. Also, while there is no opening shown in top member 310, a similar opening to those in stands 100 and 200 can be provided in order to provide a lighter stand 300 and to allow air circulation. In addition to the openings 119/219 of stands 100/200, perforations or other slots can be provided to accomplish similar goals. In addition to grooves 311, top member 310 also includes cross-cutouts 312. These cross-cutouts 312 receive tabs 371 from assembled risers 378. Each riser 378 is assembled from identical riser parts 370 that have mating notches 374 that slide into one another as shown in FIGS. 17A and 17B. Once assembled, tabs 371 form a cross in each riser 370 that fits within cross-cutouts 312 of top member 310, as well as similar cross-cutouts 392 in shelf 390, and assembled according to the set-up shown in FIG. 18.

The stand 100/200/300 can be made of any suitably rigid material, such as plastic, metal, rubber, wood, cardboard, or similar. The general shapes and proportions shown herein are for demonstration purposes only, and do not limit the scope of the invention.

According to various embodiments, the present invention provides stands for a laptop or other object. Provided embodiments may be erected on any table or desk in order to create a platform at the height of a standing desk. In some embodiments, provided stands may be produced at any of a variety of heights in order to accommodate the different heights of users and tables. In some embodiments, particular panels (e.g., panel three, for example) is adjustable to different heights. In some embodiments, the present invention weighs not more than three pounds and may collapse to the approximate size and shape of a laptop. In some embodiments, provided stands comprise three interlocking panels made of wood or some other rigid material. In some embodiments, panels one and two form a base when functionally associated with one another. In some embodiments, panels one and two are joined with two dry-fit joints: a halved joint on top and a joint that is a combination of a mortise-and-tenon through joint and a halved joint on bottom. In some embodiments, these joints have stoppers to guide assembly by lining up the panels at the joints. In some embodiments, panel three forms the platform on top and is functionally associated with panels one and two. In some embodiments, panel three may be joined to the base panels by any method known in the art and, in some embodiments, such a joining may prevent panels one and two from pivoting at their joint. In some embodiments, panel three is joined to each of panels one and two by one dry fit mortise-and-tenon joint. In some embodiments, panels one and two may form a base that is at least five inches tall. In some embodiments, panels one and two are sufficiently wide and joined at a sufficiently wide angle to form a broad base of support under panel three. In some embodiments, the dimensions of panel three vary such that a laptop computer sitting upon it may be larger or smaller than the panel. In some embodiments, each panel is at most one inch thick. According to various embodiments, provided panels may be constructed of any known material (e.g., wood, plastic, metal, carbon fiber, hard or soft foam).

In some embodiments, provided panels may be formed into any known shape or form (for example, see FIGS. 1-6). In some embodiments of the invention, the panels are rectangular, square, triangular, circular, and/or combinations thereof. In some embodiments, when the stand is disassembled, the panels may stack on one another and may be functionally associated by any use-appropriate method for ease of transport. Some embodiments of the invention may be joined by at least one dowel that is fixed to one of the panels and runs through the other panels. In some embodiments, the holes for the dowels are positioned so that the panels are reversible when stacked. In some embodiments of the invention, at least one panel is ornamented with a design. In some embodiments, a design may be or comprise at least one square, rectangle, circle, diamond, or any other shape or form in some variation or combination. In some embodiments, provided designs may pass through the panel or be scribed, burned, etched, applied as an inlay or onlay, painted, or finished on the surface of the panel using any method known in the art. In some embodiments, material may be removed from a portion of one or more of the panels to create a handle along one edge when the panels are stacked flat. In some embodiments, panel three has holes for the handle, the dowels, and the mortises to display a particular image or scene, such as, for example, the shape of a face. In some embodiments, panel three is set at an angle relative to the floor such that the laptop screen is raised closer to eye level and the keyboard is positioned at an angle. In some such embodiments, panels one and two may form the shape of a right trapezoid, and a rail 112 may be added to the lower edge of panel three in order to prevent items from sliding off the angled surface. In some embodiments, a fourth panel may be included to serve as a platform, for example to allow the use of an external mouse. In some embodiments, this panel is functionally associated with at least one of the other panels by any method known in the art. In some embodiments, panel four lies between the base and panel three such that it extends to the side of panel three and joined to the base by a mortise-and-tenon joint. One of the several advantages provided by various embodiments is a surprising weight bearing strength. In one example, a stress test was conducted on one embodiment of the invention, wherein: the panels are made out of 9 mm Baltic birth; panels one and two are joined at a right angle to each other; panel three is joined at a right angle to panels one and two; and a significant amount of material was removed from panels one and two for ornamental design. This embodiment of the invention, when assembled, did not break even when 903 pounds were stacked on top panel three. Moreover, for this embodiment of the invention, when 803 pounds were stacked on panel three, panel three was rotated approximately 12 degrees around its center axis relative to the base before the base broke.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one or the entire group members are present in, employed in or otherwise relevant to a given product or process. Furthermore, it is to be understood that the invention encompasses all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. Where elements are presented as lists, (e.g., in Markush group or similar format) it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in so many words herein. It should also be understood that any embodiment or aspect of the invention can be explicitly excluded from the claims, regardless of whether the specific exclusion is recited in the specification. The entire contents of all of the references (including literature references, issued patents and published patent applications and websites) cited throughout this application are hereby expressly incorporated by reference.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

I claim:

1. A load supporting and elevating stand comprising:
   a first base member having a first top edge;
   a second base member having a second top edge, wherein the first base member and second base member are shaped to be interlocked; and
   a top member having a top surface and a bottom surface, wherein the bottom surface of the top member rests on the first top edge and the second top edge when the stand is in an assembled configuration;
   wherein the first base member, the second base member and the top member each comprise a handle and at least one hole defined therethrough, wherein the holes are positioned collinearly upon edge alignment of the handles when the stand is in a storage configuration, the first base member, the second base member, and the top member being stacked together in the storage configuration.

2. The stand of claim 1, wherein a pin is securely attached within one of the holes of the first base member or the second base member, and slidingly extends through the other holes of the second base member or the first base member and the top member to secure stacking of the first base member, the second base member and the top member in the storage configuration.

3. The stand of claim 1, wherein the first top member defines at least one slot that corresponds with at least one of the first and second base members to prevent relative sliding of the top member with respect to the first and second base members.

4. The stand of claim 1 further comprising a pair of risers extending from the top of the top member, and a shelf supported by the risers.

5. The stand of claim 1 further comprising a third base member that is shaped to be interlocked with one of the first and second base members in the assembled configuration.

6. The stand of claim 1, wherein the stand is formed of wood.

7. The stand of claim 1, wherein the first base member, the second base member and the top member have substantially the same circumferential shape such that when in the storage position the stand appears to be a unitary structure.

8. The stand of claim 1, wherein the first top edge and the second top edge are angled from horizontal when placed on a horizontal surface, and the top surface of the top member is secured at an angle when the stand is in the assembled configuration.

9. The stand of claim 8, wherein the top surface of the top member further includes a raised portion at a front edge thereof such that objects placed on the top member do not slide off.

10. The stand of claim 1, wherein each of the first base member and the second base member comprises a tab configured to slide through a respective angled slot of the top member when the stand is in the assembled configuration.

* * * * *